UNITED STATES PATENT OFFICE.

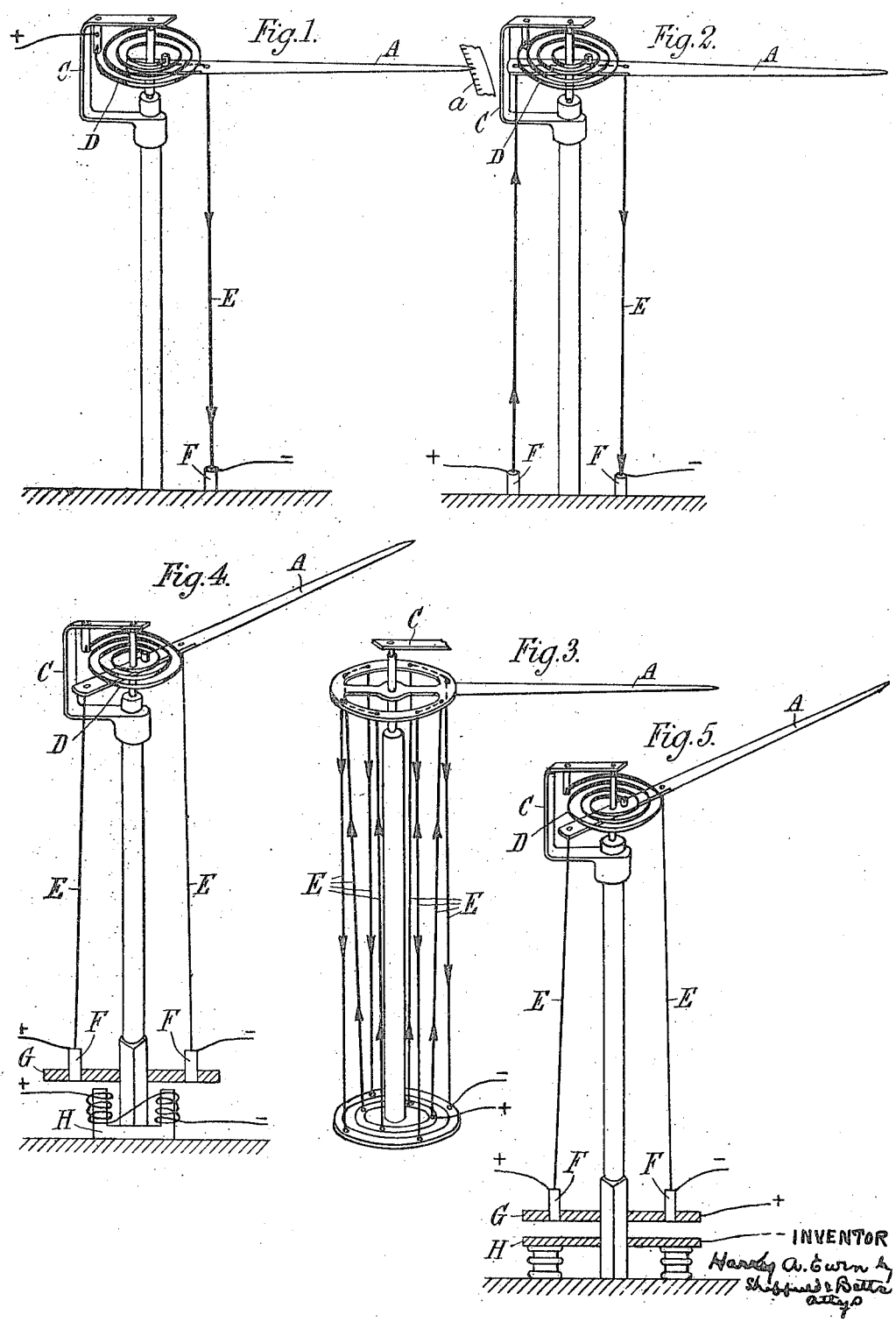

HARRY ALEXANDER EWEN, OF LONDON, ENGLAND, ASSIGNOR TO MARCONI WIRELESS TELEGRAPH COMPANY OF AMERICA, OF NEW YORK, N. Y., A CORPORATION OF NEW JERSEY.

MEASURING INSTRUMENT.

1,220,833.  Specification of Letters Patent.  Patented Mar. 27, 1917.

Application filed September 30, 1916. Serial No. 122,991.

*To all whom it may concern:*

Be it known that I, HARRY ALEXANDER EWEN, a subject of the King of Great Britain, residing at Marconi House, Strand, London, England, have invented new and useful Improvements in Measuring Instruments, of which the following is a specification.

The object of this invention is to provide an instrument in which the effect of small extensions or contractions of a filament, or of external stresses applied to the filament, may be multiplied for the purpose of measuring the amount of the extension or contraction, or the strength of the applied stress, so as to give a measure thereof.

According to this invention an arm or indicator so mounted that the only movement of which it is capable is rotation in one plane around an axis and subject to a controlling force such as that of a spring, is connected to one end of a stretched filament the other end of which is connected to a support and which is substantially parallel to the axis of the arm, so that a contraction or expansion of the filament will cause or allow a rotation of the arm.

Such an instrument may be used to indicate the contraction, expansion or temperature of the filament or filaments, or the strength of an electric current flowing through the filament or filaments.

The invention is illustrated by the accompanying drawings which show various forms of measuring instrument.

Figure 1 shows the instrument in its simplest form.

Fig. 2 shows an instrument similar to Fig. 1 except that there are two wires connected to the arm on opposite sides of the axis.

Fig. 3 shows a further modification with eight wires so arranged that the current passes through them in parallel and non-inductively.

Fig. 4 shows an instrument in which the support to which the filaments are connected is movable and acts as the armature of an electro-magnet.

Fig. 5 shows a modification of the instrument shown in Fig. 4.

In Fig. 1 A is an indicator arm having an arbor mounted in a frame C to which is secured one end of a spring D, the other end of which is secured to the arm A. E is a metal filament or wire one end of which is connected to the arm while the other end is connected to a fixed support F. The arrangement is such that the tension of the wire tends to bring the indicator into the position in which the point of attachment of the filament to the arm is as near as possible to the support F, while the spring tends to turn the arm away from that position. When therefore an electric current is passed through the filament, the latter will expand owing to its rise in temperature and allow the spring to turn the arm, and the angle through which it is so turned can be read upon a scale *a* which may be graduated to show the strength of the current.

Fig. 2 shows an instrument similar to Fig. 1 except that there are two wires connected to the arm on opposite sides of the axis.

Fig. 3 shows a further modification with eight wires so arranged that the current passes through them in parallel and non-inductively.

Fig. 4 shows an instrument in which the supports F are mounted on a plate G slidably mounted on the frame and acting as the armature of an electro-magnet H. With such a construction, the tension of the filament or conductor E and therefore the position of the indicator arm will be controlled not only by the strength of the current carried by the conductor, but also by the position of the support F. Since the position of the support F is in turn controlled by the strength of the current passing through the electromagnet H, the position of the arm A will indicate the combined result of the current in the conductor E and the current in the electromagnet H.

Fig. 5 shows an instrument in which the electrostatic force between the plate G and a plate H is employed instead of the electromagnetic force of Fig. 4.

What I claim is:—

1. In a measuring instrument, the combination of a frame, an arbor rotatably mounted therein, an arm fast on the arbor, means for applying to the arm a force tending to rotate the arbor, a support carried by the frame and capable of moving upon the frame parallel to the axis of the arbor, means for applying to the support a force tending to move it and a stretched expansible filament connected at one end to the arm and at the other end to the support.

2. In a measuring instrument, the combination of a frame, an arbor rotatably mounted therein, an arm fast on the arbor, means for applying to the arm a force tending to rotate the arbor, a support carried by the frame and capable of moving upon the frame parallel to the axis of the arbor, means for applying to the support a force tending to move it and a plurality of stretched expansible filaments each connected at one end to the arm and at the other end to the support.

3. An instrument for measuring electric currents, comprising a frame, a member rotatably mounted thereon, resilient means tending to rotate said member, a support slidably mounted on the frame, an expansible conductor connecting the member and the support, the tension of said conductor acting in opposition to said resilient means and being controlled by the strength of the current carried by the conductor and by the position of the support to determine the position of said rotary member, and means controlled by an electric current for determining the position of said support.

HARRY ALEXANDER EWEN.